ELECTRICAL APPARATUS FOR CERTIFYING MAGNETIC TAPE

Filed Nov. 7, 1957 2 Sheets-Sheet 1

INVENTOR.
HENRY W. SCHRIMPF
BY Henry L. Hanson
ATTORNEY

ELECTRICAL APPARATUS FOR CERTIFYING MAGNETIC TAPE

Filed Nov. 7, 1957 2 Sheets-Sheet 2

INVENTOR.
HENRY W. SCHRIMPF
BY Henry L. Hanson
ATTORNEY

United States Patent Office 3,088,101

Patented Apr. 30, 1963

3,088,101
ELECTRICAL APPARATUS FOR CERTIFYING MAGNETIC TAPE

Henry W. Schrimpf, Waltham, Mass., assignor to Minneapolis-Honeywell Regulator Company, Minneapolis, Minn., a corporation of Delaware Filed Nov. 7, 1957, Ser. No. 695,068
6 Claims. (Cl. 340—174.1)

A general object of the present invention is to provide a new and improved apparatus for checking the usability of an information recording medium. More specifically, the present invention is concerned with new and improved apparatus for examining a magnetic recording tape and indicating on the tape only those areas which are suitable for the recording of information.

Magnetic tape recording techniques are being widely used in conjunction with various types of data storage mechanisms primarily because of the ability of magnetic tape to store a large amount of information in a relatively small space. In one particular embodiment of such a recording apparatus, it has been found desirable to take a magnetic recording tape and divide the tape into a series of blocks or areas with each block or area being used to contain magnetic signals representing the desired information. The limits of each of the discrete areas on the tape may be defined by any of several various combinations of signals which are sometimes referred to as block limit signals. These block limit signals may be used for various control purposes in order to select the time when a particular batch of information is to be recorded on or read from the magnetic tape.

When data is stored on magnetic tape for use with digital computers, it is essential that each and every signal to be recorded and read appear in an area on the tape which is capable of receiving and storing the signal to be recorded. If so much as one digit or bit is lost in some instances, the result may be such as to render the entire batch or block of information useless. Consequently, perfection in the recording areas of a tape which are used is very advantageous.

One method of checking a magnetic recording tape is to record a signal on the tape and then see if the signal is present when the tape is passed under a reading head. If the tape has any areas which are not usable, the entire tape will be discarded. Such an arrangement as this is obviously very wasteful and expensive. The present invention overcomes the problem which has heretofore existed by the use of discrete areas of tape for storing information and by locating these areas within predetermined limits or blocks as defined by block marks. With this configuration, it is possible to provide a checking system wherein the detection of a weak or non-useful section of recording area within a block will result in the block limit signals associated with that area being eliminated from the tape. Thus, there is no danger that any information will be written into the areas where the tape is not capable of functioning in its desired manner when the tape may be used with a subsequent recording system.

It is accordingly a more specific object of the present invention to provide a new and improved magnetic tape checking or certifying apparatus which is capable of discretely characterizing those areas on the tape wherein the information should not be recorded.

In one particular embodiment of the invention, the magnetic tape to be used with the apparatus is one having a plurality of channels extending along the length of the tape and running parallel therewith. One or more of the channels is preferably designated as a channel into which the block limit signals are placed. The remaining channels other than the block limit channels, are the channels wherein the information is to be recorded. With this particular type of arrangement of data on the recording tape, it is possible to examine the entire tape and in the event that an area of the tape is found unsuitable, a signal will be applied to the block mark channel or channels to eliminate the block limit signals associated with the area which is unsuitable.

It is therefore a still further more specific object of the present invention to provide a new and improved apparatus for use with a multichannel record tape having the surface thereof divided into a series of record blocks by block limit signals recorded in one of the channels thereof in combination with means for eliminating selected block mark signals in the event that a particular area of the tape is found unsuited for the recording of information.

The foregoing and other features of novelty which characterize the invention are pointed out with particularity in the claims annexed to and forming a part of the present specification. For a better understanding of the invention, its advantages, and specific objects attained with its use, reference should be had to the accompanying drawings and descriptive matter in which there is illustrated and described a preferred embodiment of the invention.

Figure 1:
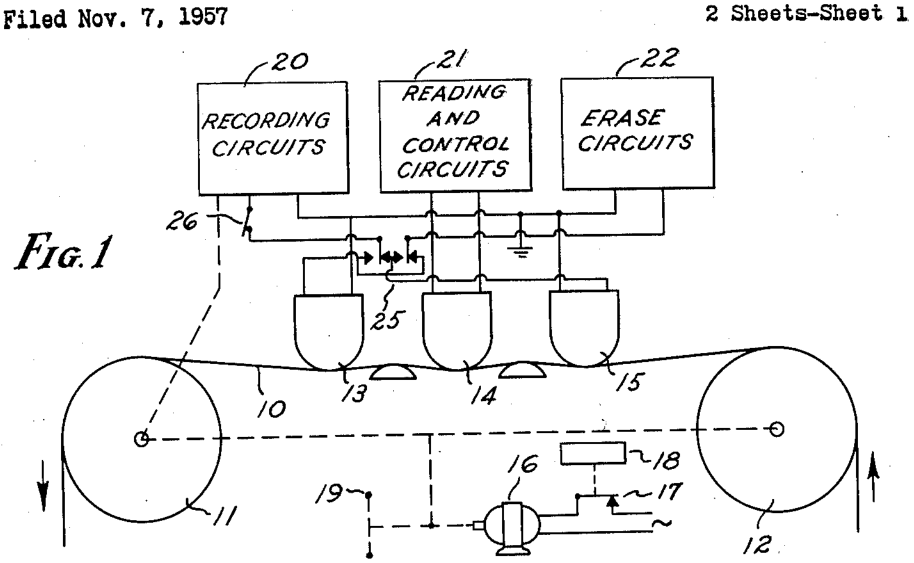
FIGURE 1 is a diagrammatic showing of recording and playback mechanism useful in carrying out the principles of the present invention.

Referring first to FIGURE 1, the numeral 10 represents a magnetic record tape which is being driven by a pair of pneumatic drive capstans 11 and 12 past a data transfer means which comprises, in this instance, a head 13, which is adapted either for recording or erasing purposes, a reading head 14, and a further head 15 which is adapted for either recording or erasing purposes. The movement of the tape by the drive capstans 11 and 12 may be by way of a suitable drive motor 16, the latter having a pair of terminals connected to a power source by way of a control switch 17 having a suitable operator 18 therefor, which may be an automatic operator for stopping the operation of the motor 16 under certain operating conditions. A manual control handle 19 may also be used to move the capstans and thereby the tape 10.

Figure 4:
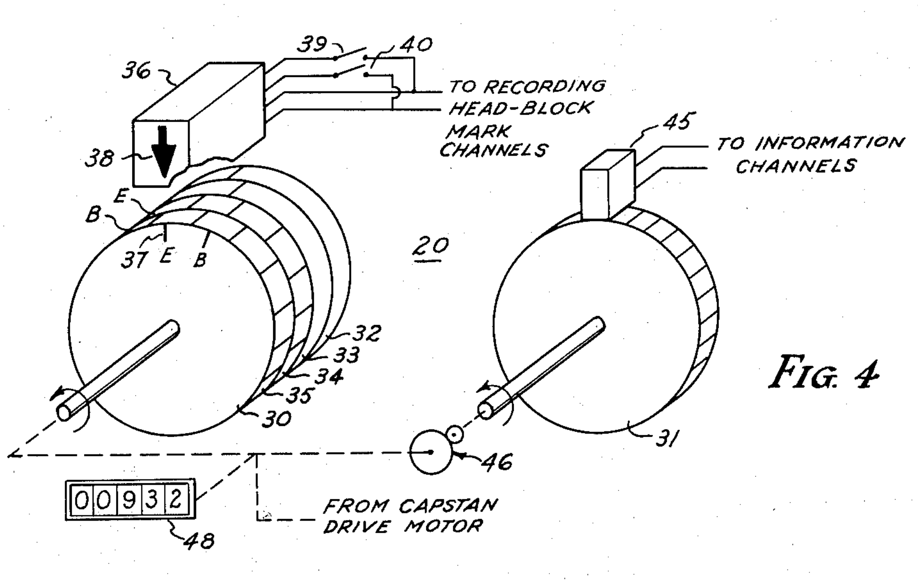
FIGURE 4 illustrates the mechanism which may be used for generating the necessary signals for recording information on the tape.
Figures 5, 6, 7:
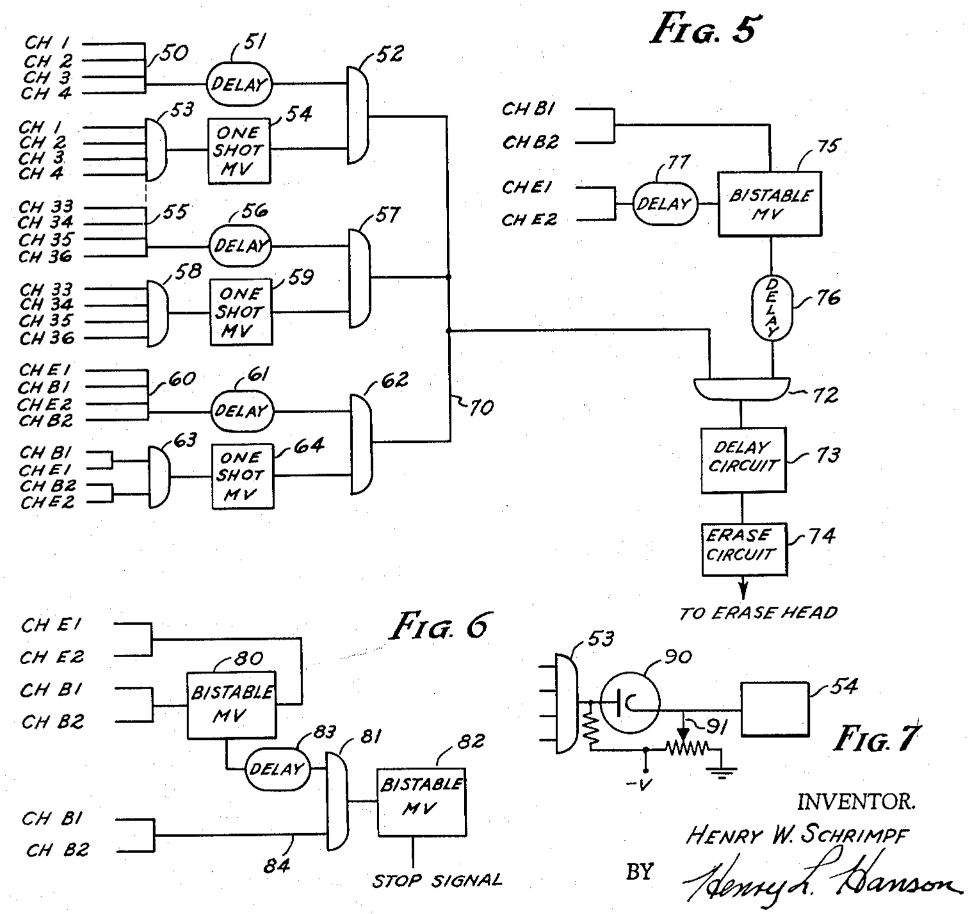
FIGURE 5 illustrates the logical circuitry used to carry out the objects of the present invention.
FIGURE 6 illustrates a further logical circuit associated particularly with the block limit signals from the tape.
FIGURE 7 illustrates a circuit for further extending the use of the present invention.

Cooperating with the data transfer heads 13–15 are suitable recording circuits indicated in the block 20, and further illustrated in FIGURE 4, and the reading and control circuits 21 and the erase circuits 22, the latter being illustrated in FIGURE 5.

Figure 2:
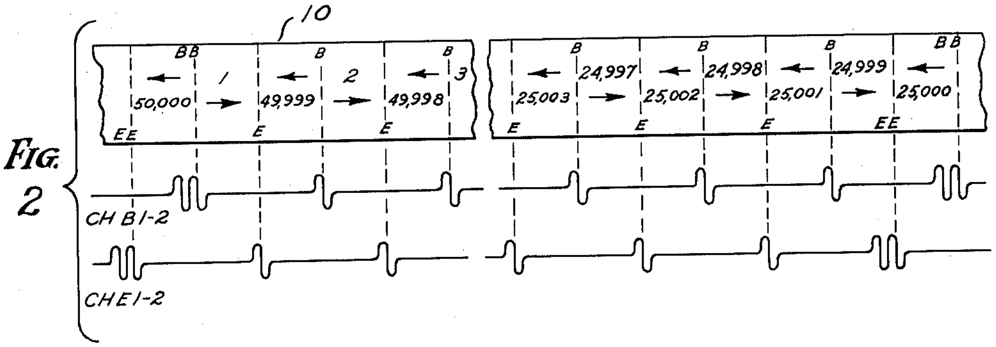
FIGURE 2 illustrates the organization of a typical form of magnetic tape and the signals associated therewith.

The magnetic tape 10 has been shown in plan detail in FIGURE 2. The plan view of the tape 10 shows that the tape has been divided into a series of discrete blocks and that these blocks have been alternately numbered first running in one direction on the tape, numbers 1, 2, 3, and on through 24,999. The blocks on the tape between the alternate blocks when passed in the other direction are numbered 25,000 through 50,000. Between each of the blocks is a dotted line which represents the dividing line between adjacent blocks on the tape.

In a tape of the type illustrated, it is essential that the individual blocks be identified and further that the beginning and end of the tape be uniquely identified with respect to the other marks on the tape. As will be apparent to those skilled in the art, there are numerous methods and techniques of magnetic recording which could characteristically identify the individual blocks on the tapes as well as the ends of the tapes. Insofar as the present application is concerned, the ends of the tape are characteristically identified by a double set of end block signals E—E in combination with a further set of double beginning signals B—B. Each set is identified by a double pulse signal. Insofar as the individual signals identifying the discrete blocks of the tape are concerned, a single pulse signal defines the beginning and end of each of the blocks. In the described embodiment of the invention, it is assumed that the tape 10 has a total of forty recording channels on the tape and these channels are running parallel along the length of the tape. Four of these channels have been set aside as block mark channels and these four channels are divided so that the beginning block marks B are duplicated in two of the channels and the end block marks E are duplicated in two additional channels. The remaining thirty-six channels of the tape are arranged to carry or store the information which is to be recorded in accordance with any desired recording scheme. The representative beginning block mark signals are illustrated in connection with the signal from the reading head and carry the designations CHB1 for the first beginning block mark channel and CHB2 for the second beginning block mark channel. The end block mark signals carry the designations CHE1 and CHE2 for the two end block mark channels.

Figure 3:
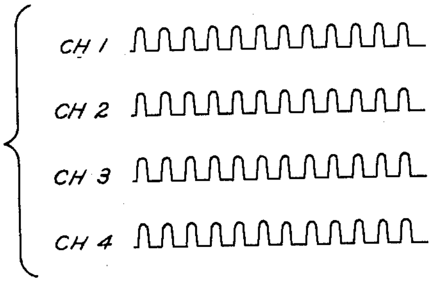
FIGURE 3 illustrates signals associated with the tape illustrated in FIGURE 2.

The information recorded within the thirty-six channels normally allotted for the recording of information may take the form illustrated in FIGURE 3. So far as the presently described invention is concerned, it is preferred that each combination of four adjacent information channels have recorded therein signals which are in synchronism with each other at the time that they are recorded. In FIGURE 3 the channel signals are identified by the notation CH1, CH2, CH3, and CH4. Thus, as used in FIGURE 4, the channel signals are CH1–CH36.

FIGURE 4 illustrates a representative mechanism which may be used for generating signals required in order to record the desired information on the tape 10 of FIGURE 1. For this purpose, there are provided a pair of timing elements or commutators 30 and 31, both of them being driven in synchronism with and by the capstan drive motor 16 of FIGURE 1. The commutator 30 has four discrete segments 32, 33, 34, and 35. Inscribed on the surface of each of the segments are a plurality of marks which may be either sensed photoelectrically or electromechanically to produce a pulse unique to the presence of each individual mark. A sensing block 36 is positioned adjacent to the commutator 30 and, in addition to sensing the presence of the marks, provides the electrical output which is supplied to the head which is functioning as the recording head in the mechanism. An indexing mark on the commutator 30 is indicated at 37 and is arranged to co-operate with a further indexing arrow 38 positioned on the end of the housing 36.

A pair of switches 39 and 40 are provided in the output leads of two of the output circuits deriving signals from the segments 32 and 33 and these are arranged to be manually operated for purposes to be explained hereinafter.

Associated with the commutator 31 is a suitable sensing head 45, the latter having a pair of output terminals for supplying signals to the recording heads associated with each of the information channels of the tape. The commutator 31 may be constructed in the manner comparable to that of the commutator 30 with each of the discrete segments being suitably detected by the sensing mechanism 45. The speed of rotation of the commutator 31 is selected to be higher than that of the segment 30 for the reason that a plurality of signals is to be recorded in the information channels between the block marks as defined by the signals generated by the commutator 30.

*Operation of Apparatus for the Recording of Signals on the Tape*

Considering next the manner in which the apparatus described thus far may be utilized for the recording of signals on the tape, it is assumed first that the operator places a reel of tape in position so that it is ready to have signals recorded thereon. When in position, the tape 10 will be threaded over both of the drive capstans 11 and 12 and will be positioned so that the active side or recording side of the tape is adjacent the data transfer heads 13, 14 and 15. Initially, the operator will align the index 37 on the commutator 30 with the arrow 38 on the housing 36. This position is defined as a starting position for generating the signals to be placed on the tape. At the same time, the operator will close the switches 39 and 40. With the index mark 37 in alignment with the arrowhead 38, the operator will turn the handle 19 manually and thence the commutator 30 in a counter-clockwise direction. The commutator segment 32 will, by the mark immediately under the head, produce a first signal for an end mark signal E and then the commutator segment 34 will produce a second signal E which is immediately adjacent the first to produce the double end signal E—E as illustrated in FIGURE 2. The operator will then continue to rotate the commutator 30 in a counter-clockwise direction by way of the handle 19 until the next beginning mark B from the commutator segment 33 passes under the head 36. This will produce the first beginning block mark B and a further rotation of the commutator 30 will, by way of the commutator segment 35, produce a second block mark B to form the double block mark B—B indicated in FIGURE 2. After the operator has placed these special end signals on the tape, the switches 39 and 40 will be opened and the power may be switched onto the drive motor 16. The apparatus will then start placing the desired signals on the tape automatically. The opening of switches 39 and 40 is effected so that only the block mark signals from the commutator segments 34 and 35 will be recorded in the block mark channels on the tape.

While the block mark signals are being placed on the tape in the block mark channels, the commutator 31 will be effective to supply signals to all of the other information channels on the tape and the signals recorded will be a series of pulses as indicated in FIGURE 3. The recording will continue until the operator senses that the end of the tape is approaching and at that time he will cut the power off from the motor 16. The operator will then manually go through the procedure of rotating the tape after having closed the switches 39 and 40 to produce the block mark signals indicating the end and beginning of the tape. The end of the tape may be appropriately indicated by a counter which is counting the number of block marks that have been laid down. If, for example, it is desired that the tape contain 50,000 blocks, the operator may observe the counter 48 to determine when the power should be cut off the motor 16, or the counter may directly activate the motor control 18 when a predetermined count is reached.

*Reading Circuits*

The reading check circuits are illustrated in FIGURE

5. In this figure, there is illustrated circuitry for checking to see that each and every signal which has been recorded on the tape by the recording mechanism has actually been recorded and is capable of being read. With this circuitry, it is desired that if any one signal is absent, the erase head of the mechanism will receive a signal which will erase the block marks associated with the area wherein the signal did not appear.

Considering FIGURE 5 more specifically, there is illustrated a plurality of input circuits from each of the channels identified by the notation CH1–CH36. In addition there is a further input from each of the block mark channels identified by the notation CHB1, CHB2, CHE1 and CHE2.

Each of the information channels are checked in combinations of four. Thus, channels CH1–CH4 are buffered together on a buffer line 50 where upon the presence of any one of the signals, an output signal will be fed into a delay line 51 to an input gate leg of a gating circuit 52. In addition, the signals CH1–CH4 are gated together on a gating circuit 53. In this circuit, it is essential that each of the signals gated together be present at the same time in order for a signal to pass through the gate 53. Connected to the output of the gate 53 is a one shot multivibrator 54, the latter of which has an output normally activating the other gate leg of the gate 52 unless the one shot multivibrator has been fired. Once the multivibrator has been fired, the gate leg connected thereto will go down so that the gate 52 will close for a predetermined period of time.

Each of the other channels associated with the tape have a like buffer and gating section circuitry associated therewith with each of the individual combinations being so arranged that if any one of the signals is absent on the input gating circuit of the combination, the output gating circuit will have an output signal which will activate appropriate erase circuitry. Thus channels CH33–CH36 are associated with a buffer line 55 and a gate 58. The output of the buffer line 55 feeds a delay circuit 56 and then a gate leg of an output gate 57. The output of the gate 58 feeds into a one shot multivibrator 59 which in turn controls the other gate leg of gate 57.

The buffer circuits and the gating circuits discussed herein may well be of the type disclosed in an article by N. S. Zimbel in the Convention Record of I.R.E., 1954, National Convention, Part 4 entitled "Packaged Logical Circuitry."

Insofar as the block mark signals are concerned, there is provided here a buffer section 60 having the four block mark channel input circuits connected thereto. The output of this buffer line 60 is fed through a delay circuit 61 to a gating circuit 62. A further gating section 63 is provided and this gating section has a pair of inputs which are adapted to be activated by the duplication of the signals CHB1 and CHB2 or CHE1 and CHE2. The output of the gating circuit 63 feeds a further one shot multivibrator 64. This multivibrator, like the multivibrator 54, is normally maintaining the gate leg of the gate 62 associated therewith active. However, if a signal gets through the gate 63, the one shot will fire for a predetermined length of time and close the gate 62. This will prevent the feeding of any signal calling for a block mark erasure to the output circuitry.

All of the gating sections are buffered together on a buffer line 70 and thence to one gate leg of a gate 72. The gate circuit 72 in turn feeds a control signal into a delay circuit 73, the latter having an output controlling an erase circuit 74. The delay circuit 73 may well comprise any type of electronic pulse shift register producing a delay related to the transit time of the tape between the heads 14 and 13. The circuit 74 feeds an output signal to the erase head, the latter being positioned relative to the block mark channels to erase those beginning block marks associated with the area of the tape wherein a defect may have been detected. The gate 72 has a further input which permits activation of the delay circuits only during those instances when a block is being examined in the forward direction. This is accomplished by feeding the beginning block mark signals CHB1 and CHB2 to the input of a bistable multivibrator 75 to switch the multivibrator to an active state. When so switched, the output thereof will be fed through a delay line 76 to the gate 72 to condition this particular gate to pass a signal from the buffer line 70. As soon as the end block marks have been sensed, the signals CHE1 and CHE2 will, after a time delay produced by a delay circuit 77, switch the bistable multivibrator 75 back to the other state. This deactivates the output thereof so that after a predetermined delay, determined by the delay circuit 76, the gate 72 will be closed. The delay in the circuit 77 permits complete examination of each block despite tape skew as it passes under the heads. The delay 76 is provided to time the circuits relative to the timing in the delay circuits 51, 56 and 61.

*Operation of Reading, Checking, and Erase Circuits*

As discussed above, as the tape passes under the recording head 15, it will have the signals identified in FIGURES 2 and 3 recorded on the tape, unless there is a defect on the tape such that the tape can not receive the signals supplied thereto. As the tape continues to move under the data transfer means, it will next come under the head 14 where the signals on the tape will be read. The signals on each of the channels will be applied to the checking circuitry illustrated in FIGURE 5. As long as all of the signals have been recorded on the tape and are detected by the reading circuits, the circuitry of FIGURE 5 will not produce any signal suitable for producing an output from the gate 72. This will mean that there will be no activiating signal applied from the gate 72 to the delay circuit 73 or erase circuit 74. However, assume that one of the signals from one of the channels does not appear at the instant that the corresponding signals appear in the other channels. Thus, if the signal from CH3 should not appear in one particular timing position, no signal will be passed through the gate 53 to the one-shot multivibrator 54. Consequently, the gate leg associated with the multivibrator 54 will remain active such that a CH1, CH2, and CH4 signal will be able to pass through the buffer 50, the delay line 51 and the gate 52 to the output buffer line 70. From here, the signal will pass to the gate 72 so that the latter will be conditioned on its left gate leg so that it will pass a signal therethrough to activate the delay circuit 73 and erase circuit 74. The timing of this erase signal is so arranged that the beginning block mark signal, designating the beginning limit with respect to the area wherein the error is detected, will be erased. This is determined by the timing of the delay circuit 73 and the timing of the erase circuit 74. The timing of the erase circuit 4 is a direct function of tthe time and speed of travel of the tape past the erase head. Thus the erase signal will be applied to the head 13 for a sufficient length of time to insure that the block marks associated with the bad space will be eliminated. For example, if the tape 10 should have a flaw in block number 2, as noted in FIGURE 2, the block mark which would be eliminated would be the block marks identifying the beginning of block 2 when read in either direction.

After the tape has reached one end and been identified by the double block marks associated with the block 25,000 of FIGURE 2, the tape will be reversed. When the tape is reversed, the alternate blocks will be sensed by the reading head 14 and the erase circuits will be effective to eliminate any beginning block mark associated with any particular block wherein a bad section of tape is detected. In this particular instance, when the tape is running in the reverse direction, the recording circuits are deactivated by the opening switch 26, at the time that this reversal is undertaken. The operator will also switch the switch 25 from the position shown upon the drawing to the opposite position so that now the erase head will be head number 15.

The apparatus illustrated in FIGURE 6 has been provided to stop the tape handling mechanism in the event that there are two beginning block marks sensed without an intervening end block mark. The inputs in this instance are the beginning block mark signals CHB1 and CHB2 and the end block mark signals CHE1 and CHE2. Initially, the beginning block mark signals CHB1 and CHB2 will normally be detected and will supply an activating signal to switch the bistable multivibrator 80 to its active position. When so switched, the output thereof will be applied to the delay network 83 and then to a gate 81 to supply an activating signal to this gate. Also, the beginning block mark signal CHB1 and CHB2 will be applied to the input 84 of the gate 81, the latter normally will not appear on the output of the gate 81 because the delay network 83 prevents arrival of the activating signal until after this signal on input 84 has passed. If the end block mark signals CHE1 and CHE2 are not detected, the bistable multivibrator 80 will not be switched back to its opposite state to deactivate the upper gate leg of the gate 81. If a second beginning block mark signal is sensed, this signal will be passed through the gate 81 and the output control multivibrator 82 will be switched and will supply a stop signal which may be used to operate the controller 18, illustrated in FIGURE 1, to open the switch 17 and de-energize the drive motor 16. When the tape has been stopped in this manner in a position other than the proper position at either end, the operator may manually control the erase, by means not shown, to eliminate the two beginning block marks which activated circuit 82.

With the block mark system shown wherein a double beginning block mark is used at the ends of the tape, this circuit may be used to automatically stop the tape once the block marks have been placed on the tape.

FIGURE 7 illustrates one manner in which the apparatus may be modified to further limit the areas where recording may take place on the tape. Thus, the tape may be capable of recording a signal but this recording is sufficiently weak that the reliability thereof cannot be assured. Thus, it may be desired to provide a threshold adjustment. Such is illustrated in FIGURE 7 with respect to the gating circuit 53 and the one shot multivibrator 54 of FIGURE 5. Added to the coupling circuit is a diode 90 and a potentiometer 91. One end of the potentiometer is connected to a negative power supply terminal and the other end is connected to ground. The slide of the potentiometer is connected to the diode 90 and provides a bias therefor in accordance with the provision thereof on the slidewire.

In operation, it will be apparent that the diode 90 will not conduct until the input signal from the gate 53 exceeds the bias potential from the potentiometer 91. Thus, weak signals may readily be treated as no signal and the block marks may be erased to eliminate from active use those areas where recording is marginal.

It will be readily apparent to those skilled in the art that the foregoing described embodiment of the present invention has been illustrative only and that the desired ends may be accomplished in many other ways. Thus, it will be readily apparent that certain features of the invention may be automated to further minimize the requirements made of the operator in carrying out of the principles of the present invention.

Having now described the invention, what is claimed as new and for which it is desired to secure by Letters Patent is:

1. Apparatus for certifying a recording medium having defined along the length thereof by magnetic record indicia the beginning and end of a plurality of specific areas wherein discrete bits of digital information are to be magnetically recorded comprising digital information reading means positioned adjacent said record to read magnetically the digital information and the beginning and ending magnetic record indicia thereon, signal sensing means connected to said last named means to sense the presence or absence of magnetic digital information or magnetic record indicia, and magnetic indicia erasing means positioned adjacent said record medium, said erasing means being connected to said sensing means to be controlled thereby to erase the beginning and ending record indicia associated with any area wherein the absence of digital information or record indicia is sensed.

2. Apparatus as defined in claim 1 wherein said signal sensing means comprises a plurality of gating sections, each having a plurality of inputs from said sensing means, a plurality of buffer sections, each having a plurality of inputs from said sensing means, and means connecting each one of said buffers with corresponding ones of said gating sections in combination to produce an output control signal when any one of the signals from said record medium is not sensed.

3. Apparatus as defined in claim 2 wherein threshold control means are connected to the output of said gating sections.

4. Apparatus for preparing a magnetic tape for use in the storing of intelligence to be magnetically recorded comprising a magnetic tape, said tape having been subjected to a recording field for selectively magnetizing said tape to define by way of magnetic indicia the limits of preselected areas along the length of the tape and between which a plurality of separate and discrete data-identifying indicia signals have been recorded longitudinally on the tape, a magnetic signal reading head positioned adjacent said tape to read the discrete signals recorded thereon within the limits of said magnetic indicia, control means connected to said reading head, said control means comprising means sensing the absence of any one of the discrete signals normally present on said magnetic tape between the limits of said magnetic indicia, and means connected to said control means and positioned adjacent said magnetic tape to erase from said magnetic tape those indica defining both longitudinal limits of an area wherein the absence of a discrete signal has been detected.

5. Apparatus for preparing a magnetic tape for use in the storing of intelligence to be magnetically recorded comprising a magnetic tape, a magnetic recording means positioned adjacent said tape to subject said tape to a recording field for selectively magnetizing said tape to define by way of magnetic indicia the longitudinal limits of preselected areas along the length of the tape and to a further recording field to record a plurality of discrete information signals between the limits of said preselected areas, a magnetic signal reading head positioned adjacent said tape to read the discrete signals recorded thereon between the limits of said magnetic indicia, control means connected to said reading head, said control means comprising means sensing the absence of any one of the discrete signals normally present on said magnetic tape between the limits of said magnetic indicia, and means connected to said control means and positioned adjacent said magnetic tape to erase from said magnetic tape those indicia defining both longitudinal limits of an area wherein the absence of a discrete signal has been detected.

6. Apparatus for checking the recording capabilities of a magnetic record tape comprising a multi-channel data transfer means positioned adjacent said tape, first means connected to said data transfer means to apply magnetically to said tape in a selected channel first type signals to define the external limits of preselected areas along the length of said tape, second means connected to said data transfer means to apply magnetically to said tape in channels other than said selected channel a further type of signal in said areas, control means connected to said data transfer means to sense the presence or absence of said first or further type of signal, and means including said control means connected to said data transfer means to erase magnetically each of said first type signals which define the limits of any area on said tape where the absence of a signal has been detected.

References Cited in the file of this patent

UNITED STATES PATENTS

| | | |
|---|---|---|
| 2,702,315 | Roderick | Feb. 15, 1955 |
| 2,782,398 | West et al. | Feb. 19, 1957 |

| | | |
|---|---|---|
| 2,793,344 | Reynolds | May 21, 1957 |
| 2,813,259 | Burkhart | Nov. 12, 1957 |
| 2,816,162 | Johnson | Dec. 10, 1957 |
| 2,817,829 | Lubkin | Dec. 24, 1957 |

OTHER REFERENCES

"Problems Involved in Magnetic Tape Recording" (Gibbs), Audio, Vol. 38, No. 3, March 1954, pp. 19–21, and 52.

"Apparatus for Magnetic Storage on Three Inch Wide Tapes" (Lawrance et al.), Proceedings of the Eastern Joint Computer Conference, pp. 84–89, Dec. 10–12, 1956.